United States Patent
Asano (10) Patent No.: US 11,581,108 B2
(45) Date of Patent: Feb. 14, 2023

(54) WATERPROOF CABLE AND WATERPROOF CABLE MANUFACTURING METHOD

(71) Applicant: HOSIDEN CORPORATION, Osaka (JP)

(72) Inventor: Takao Asano, Gumma (JP)

(73) Assignee: HOSIDEN CORPORATION, Osaka (JP)

(*) Notice: Subject to any disclaimer, the term of this patent is extended or adjusted under 35 U.S.C. 154(b) by 3 days.

(21) Appl. No.: 17/064,003

(22) Filed: Oct. 6, 2020

(65) Prior Publication Data

US 2021/0151220 A1 May 20, 2021

(30) Foreign Application Priority Data

Nov. 19, 2019 (JP) ............................. JP2019-208934

(51) Int. Cl.
| | | |
|---|---|---|
| *H01R 13/40* | (2006.01) | |
| *H01B 7/282* | (2006.01) | |
| *H01R 13/52* | (2006.01) | |
| *H01R 43/00* | (2006.01) | |

(52) U.S. Cl.
CPC ....... *H01B 7/2825* (2013.01); *H01R 13/5205* (2013.01); *H01R 43/005* (2013.01)

(58) Field of Classification Search
CPC . H01B 7/2825; H01R 13/5205; H01R 43/005
USPC ........................................................ 439/587
See application file for complete search history.

(56) References Cited

U.S. PATENT DOCUMENTS

| | | | | | |
|---|---|---|---|---|---|
| 2,812,506 | A | * | 11/1957 | Merrill ................. | H01R 43/042 439/736 |
| 4,032,214 | A | * | 6/1977 | McNerney ............ | H02G 15/06 439/606 |
| 5,424,578 | A | * | 6/1995 | Fujita ................ | H01L 23/49582 257/E21.504 |
| 5,456,791 | A | * | 10/1995 | Ueno .................... | H02G 1/145 29/841 |
| 5,702,810 | A | * | 12/1997 | Koseki .................... | B29C 44/12 428/319.7 |
| 5,709,559 | A | * | 1/1998 | Fujitani ................. | B29C 70/681 439/130 |
| 5,724,730 | A | * | 3/1998 | Tanaka ............. | B29C 45/14639 174/76 |
| 5,727,408 | A | * | 3/1998 | Mizuno ................... | E05B 19/04 343/788 |
| 5,733,802 | A | * | 3/1998 | Inoue .................... | H01L 21/565 438/126 |

(Continued)

FOREIGN PATENT DOCUMENTS

| | | |
|---|---|---|
| JP | 2001-297852 A | 10/2001 |
| JP | 4926340 B2 | 5/2012 |

*Primary Examiner* — Abdullah A Riyami
*Assistant Examiner* — Vladimir Imas
(74) *Attorney, Agent, or Firm* — Greenblum & Bernstein, P.L.C.

(57) ABSTRACT

To provide a waterproof cable that is easily manufactured and improves waterproofness.
The waterproof cable includes: a first cable; a second cable, an end of which is connected with an end of the first cable; a first resin member that coats a connecting part and is formed by insert-molding; a second resin member that coats the first resin member and is formed by insert-molding; and a third resin member that coats the second resin member and is formed by insert-molding.

8 Claims, 10 Drawing Sheets

(56) References Cited

U.S. PATENT DOCUMENTS

| | | | | |
|---|---|---|---|---|
| 5,770,818 | A * | 6/1998 | Tanaka | H01R 12/61 |
| | | | | 174/84 R |
| 5,780,774 | A * | 7/1998 | Ichikawa | H01R 12/61 |
| | | | | 174/117 FF |
| 5,821,628 | A * | 10/1998 | Hotta | H01L 21/56 |
| | | | | 257/784 |
| 6,376,773 | B1 * | 4/2002 | Maegawa | H01R 12/63 |
| | | | | 174/117 F |
| 7,004,789 | B2 * | 2/2006 | Kameyama | H01R 13/562 |
| | | | | 439/588 |
| 8,460,023 | B2 * | 6/2013 | Someya | H01R 13/6273 |
| | | | | 439/275 |
| 8,784,119 | B2 * | 7/2014 | Tseng | H01R 12/61 |
| | | | | 439/495 |
| 8,829,350 | B2 * | 9/2014 | Iwasaki | H01B 7/295 |
| | | | | 174/121 A |
| 9,640,299 | B2 * | 5/2017 | Sugita | C08L 23/0853 |
| 9,742,168 | B2 * | 8/2017 | Kanagawa | H02G 3/0462 |
| 9,882,307 | B2 * | 1/2018 | Sugita | H01B 7/282 |
| 9,892,824 | B2 * | 2/2018 | Perego | H01B 9/006 |
| 10,395,796 | B2 * | 8/2019 | Kobayashi | H01B 7/00 |
| 10,476,199 | B2 * | 11/2019 | Kim | H01R 13/5213 |
| 2010/0147549 | A1 * | 6/2010 | Shiina | H01B 7/295 |
| | | | | 174/120 SR |
| 2021/0151220 | A1 * | 5/2021 | Asano | H01R 43/005 |

\* cited by examiner

WATERPROOF CABLE AND WATERPROOF CABLE MANUFACTURING METHOD

TECHNICAL FIELD

The present invention relates to a waterproof cable and a waterproof cable manufacturing method.

BACKGROUND ART

Japanese Registered Patent No. 4926340 (hereinafter referred to as Patent Literature 1), for example, discloses a molding structure of a cable connecting part and a molding method, as a related art. Patent Literature 1 discloses a structure of a molding part for insulating and protecting a connecting part on which conductors of cables are connected with each other. In the structure, a core in which a pair or a plurality of pairs of positioning side wall pieces are formed integrally on one surface of a positioning substrate piece is used. A conductor connecting part is inserted between the side wall pieces of the core, the connecting part is arranged on the substrate piece, and the conductor connecting part and the core are molded from resin in a state in which cable wires are arranged at intervals so as not to be mutually overlapped as seen in a planar manner. Planar positioning pieces for positioning the core on the molding part are formed integrally on the other surface of the substrate piece.

Japanese Patent Application Laid Open No. 2001-297852 (hereinafter referred to as Patent Literature 2), for example, discloses a waterproof treatment method for a joint portion of a cable, as a related art. The waterproof treatment method for a joint portion in Patent Literature 2 is a method for performing waterproof treatment on the joint portion between wirings and includes: a first molding process in which positioning portions are formed at the prescribed position from the joint portion; and a second molding process in which, after the first molding process, the joint portion is positioned with respect to the positioning portions and further the surrounding of the joint portion is coated by resin. According to the waterproof treatment method for a joint portion described in claim 1 of Patent Literature 2, the positioning portions are formed at the prescribed position from the joint portion in the first molding process. In the second molding process, the positioning portions obtained in the preceding process are first positioned in a fixed manner, being able to accurately position the joint portion provided at the prescribed position from the positioning portions. Thus, the surrounding of the joint portion is coated by resin in a state in which the joint portion is accurately positioned, being able to form a waterproof layer having appropriate thickness around the joint portion.

SUMMARY OF THE INVENTION

The molding structure in Patent Literature 1 secures waterproofness and performs positioning by using a core, but has a problem in that parts management takes labor and manufacturing thereof is not easy. Further, the waterproof treatment method in Patent Literature 2 is a method for securing waterproofness up to the second molding process. Therefore, if a mold pin is used for positioning, for example, water might infiltrate into an inside through a hole formed for the mold pin, exhibiting insufficient waterproofness.

An object of the present invention is to provide a waterproof cable that is easily manufactured and improves waterproofness.

A waterproof cable according to the present invention includes a first cable, a second cable, a first resin member, a second resin member, and a third resin member.

An end of the second cable is connected with an end of the first cable. The first resin member coats a connecting part and is formed by insert-molding. The second resin member coats the first resin member and is formed by insert-molding. The third resin member coats the second resin member and is formed by insert-molding.

According to the waterproof cable of the present invention, manufacturing is easy and waterproofness is improved.

DETAILED DESCRIPTION OF THE EMBODIMENTS

An embodiment of the present invention will be described in detail below. Components having the mutually-same functions will be given the same reference characters and duplicate description thereof will be omitted.

First Embodiment

<Waterproof Cable 1>

A waterproof cable 1 according to a first embodiment includes three layers of resin layers for waterproofing a connecting part between cables. As illustrated in FIGS. 1 to 4, for example, the waterproof cable 1 includes three layers of resin layers for waterproofing a connecting part on which an end 911 of each core wire of a first cable 91 and an end 921 of each core wire of a second cable 92 are connected with each other.

Figure 1:
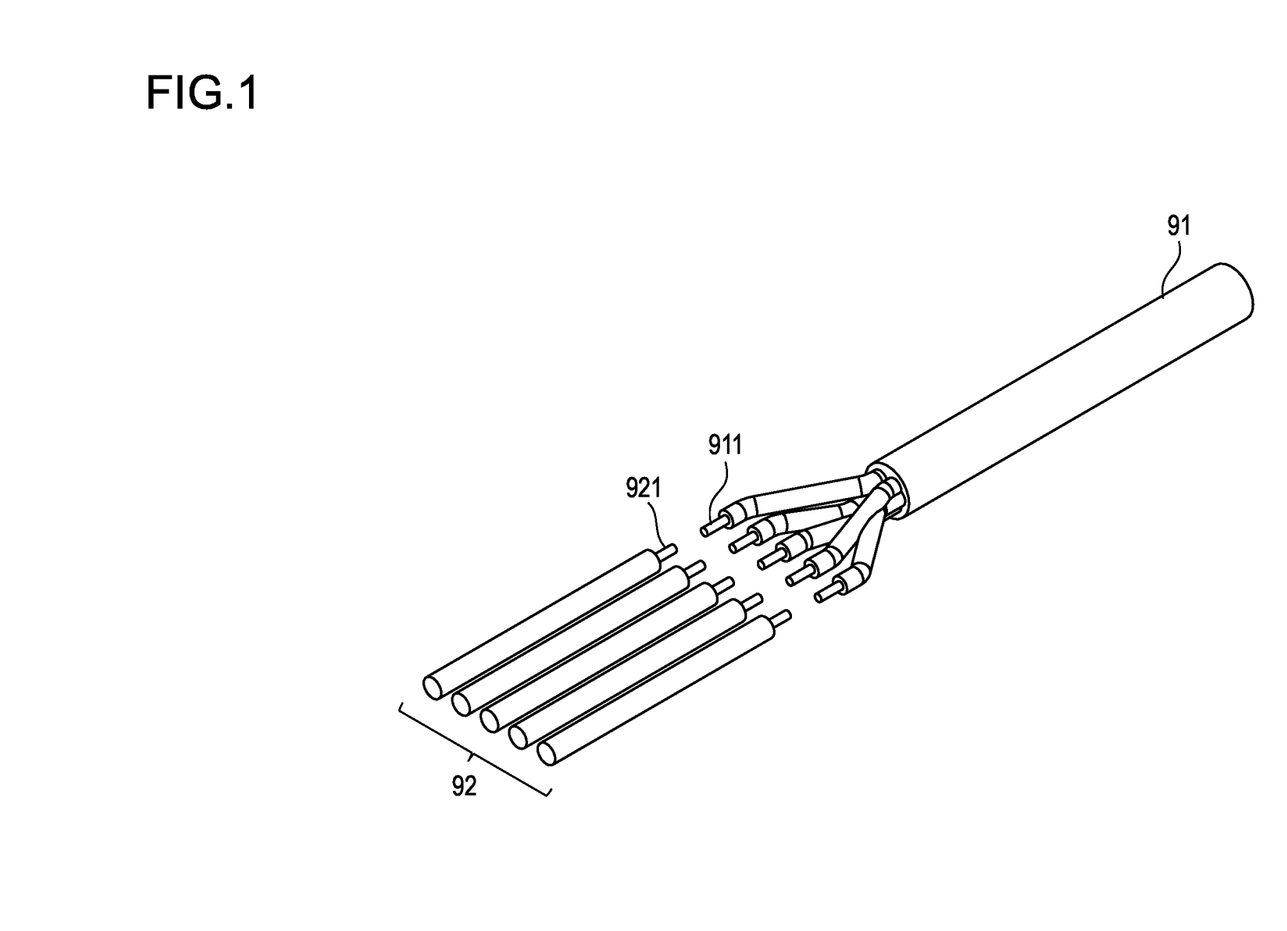
FIG. 1 is a perspective view illustrating a connecting part between a first cable and a second cable.

The connecting part illustrated in FIG. 1 is typically provided to a branch part of a cable. Also, the connecting part may be merely provided to a joint portion between cables. The other sides of the connecting portion of the cables may be connected by a plug or the like or be wired in equipment and thus, the waterproof cable 1 is variously applied.

In the present embodiment, a plurality of core wires are branched at the end of the first cable 91 and are connected to respective core wires of the second cables 92. The ends 911 and the ends 921 may be respectively connected with each other by soldering, for example. In the present embodiment, the core wires of the second cables 92 are aligned in a row in a direction orthogonal to an extending direction of the core wires.

Figure 2:
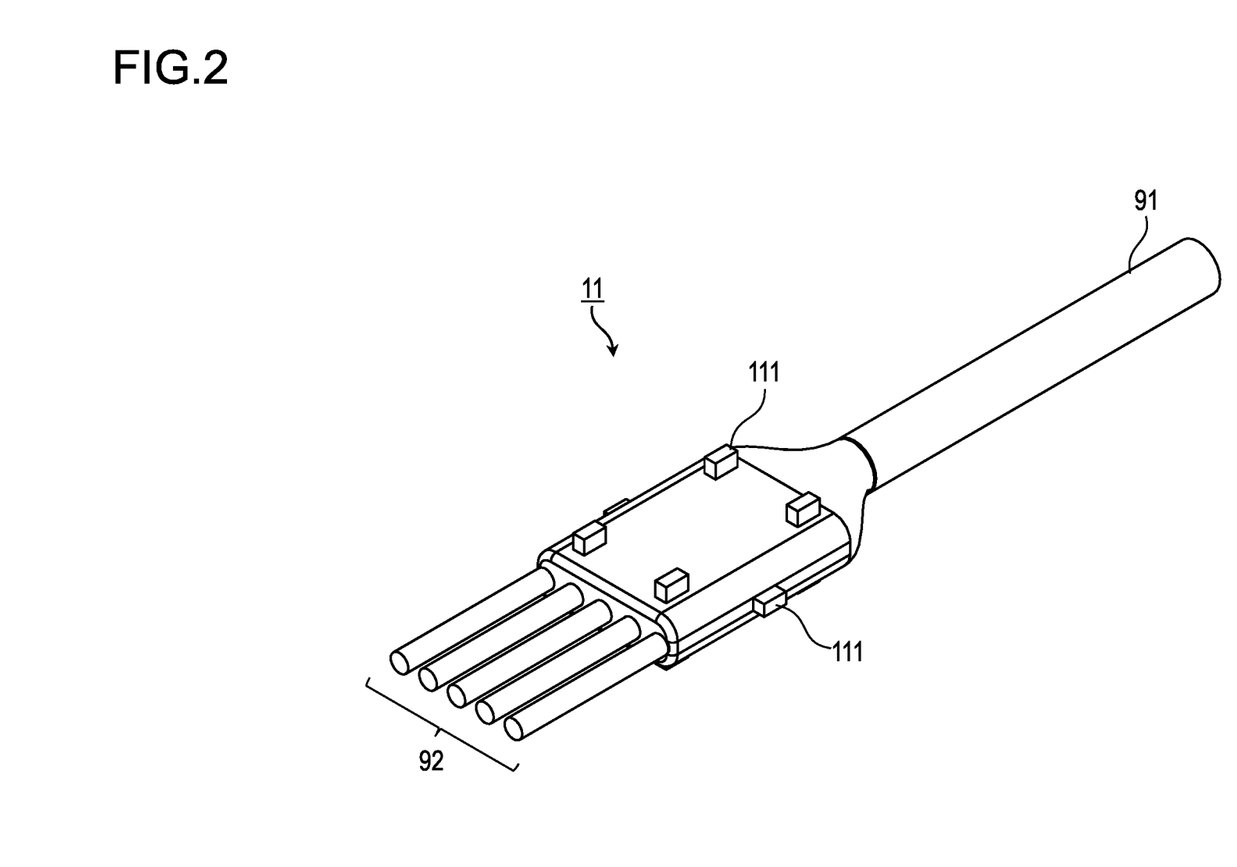
FIG. 2 is a perspective view illustrating a first resin member formed on the connecting part by insert-molding.

As illustrated in FIG. 2, a first resin member 11 coats the above-mentioned connecting part and is formed by insert-molding. In the present embodiment, since the core wires of the second cables 92 are aligned in a row in the direction orthogonal to the extending direction of the core wires, the first resin member 11 is formed to have a flat and substantially rectangular parallelepiped shape, covering all the core wires.

The first resin member 11 is provided with positioning convex portions 111 formed to be brought into contact with inner surfaces of a mold for second molding which is used for forming a second resin member 12 described later. In the present embodiment, the positioning convex portions 111 are formed at least one by one on four surfaces (top surface, right side surface, left side surface, and bottom surface), through which the first cable 91 and the second cable 92 do not penetrate, of the first resin member 11. In the example of FIG. 2, four positioning convex portions 111 are formed on each of the top surface and the bottom surface of the first resin member 11 and one positioning convex portion 111 is formed on the center of each of the right side surface and the left side surface of the first resin member 11.

Figure 3:
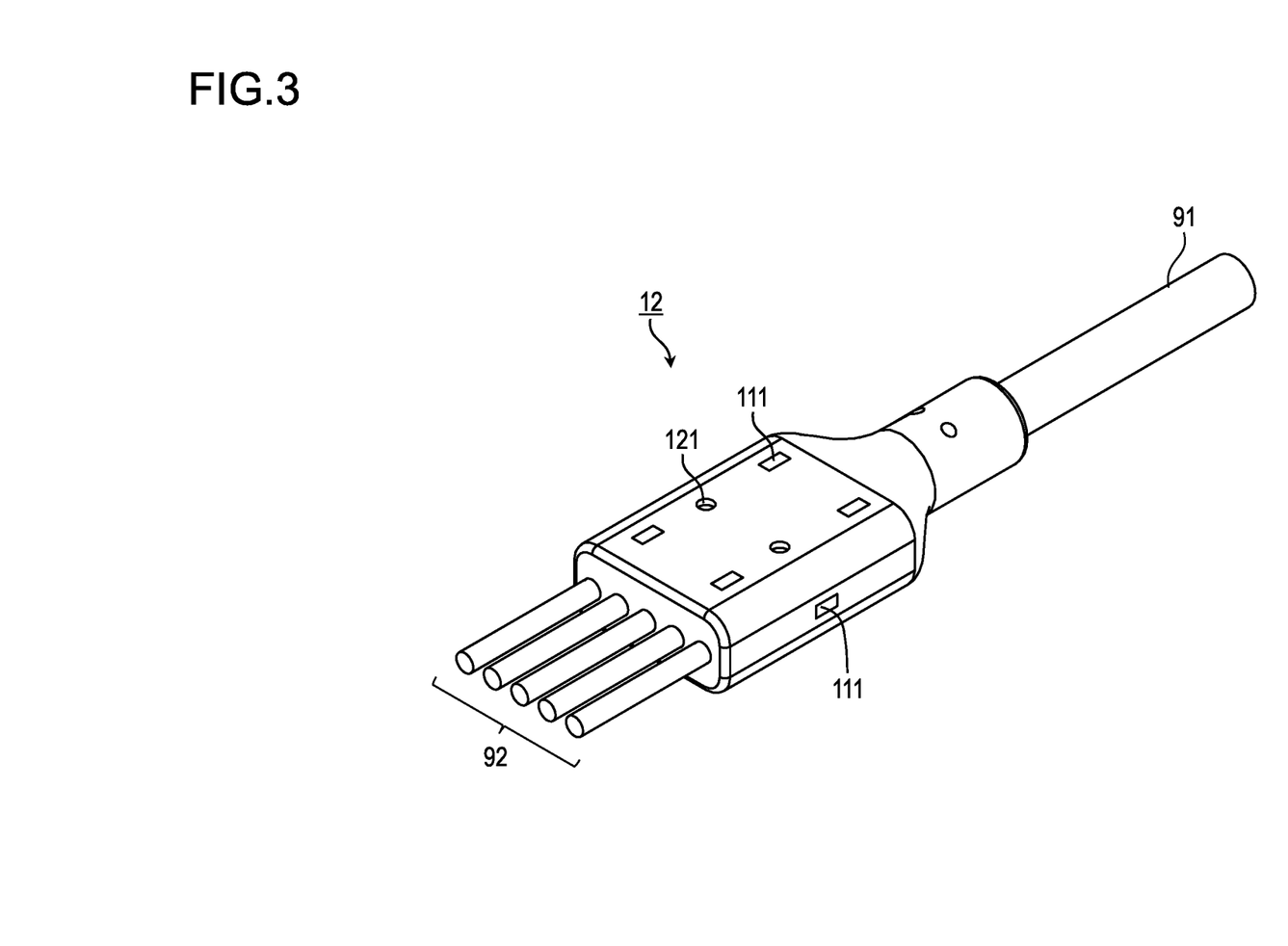
FIG. 3 is a perspective view illustrating a second resin member formed on the connecting part by insert-molding.

Positioning of the first resin member 11 is performed by bringing the ends of the positioning convex portions 111 into contact with the inner surfaces of the mold for second molding. Specifically, as illustrated in sectional views of FIGS. 7 to 9, the second resin member 12 is formed in a manner to fill a void which is formed by the inner surfaces of the mold for second molding and the positioning convex portions 111. Accordingly, each of the ends of the positioning convex portions 111 and each corresponding surface of the second resin member 12 are positioned in the same plane, as illustrated in FIG. 3. Thus, with the positioning convex portions 111, portion, excluding the positioning convex portions 111, of the first resin member 11 is securely coated by the second resin member 12. Consequently, even if part of core wires or solder sticks out to the outside of the first resin member 11 due to a manufacturing error or the like, the sticking-out part is coated and waterproofed by the second resin member 12.

As illustrated in FIG. 3, the second resin member 12 is provided with concave portions 121 which are formed for inserting a mold pin for fixing the second resin member 12 in the third molding thereinto. The concave portion 121 is formed on the second resin member 12 as a depression which does not penetrate through the second resin member 12, securing waterproofness. The concave portion 121 needs to be formed on a position which is different from a position of the positioning convex portion 111. The concave portions 121 facilitate appropriate positioning of the second resin member 12 with respect to a third resin member 13 and accordingly, the whole of the second resin member 12 is securely coated by the third resin member 13.

Figure 7:
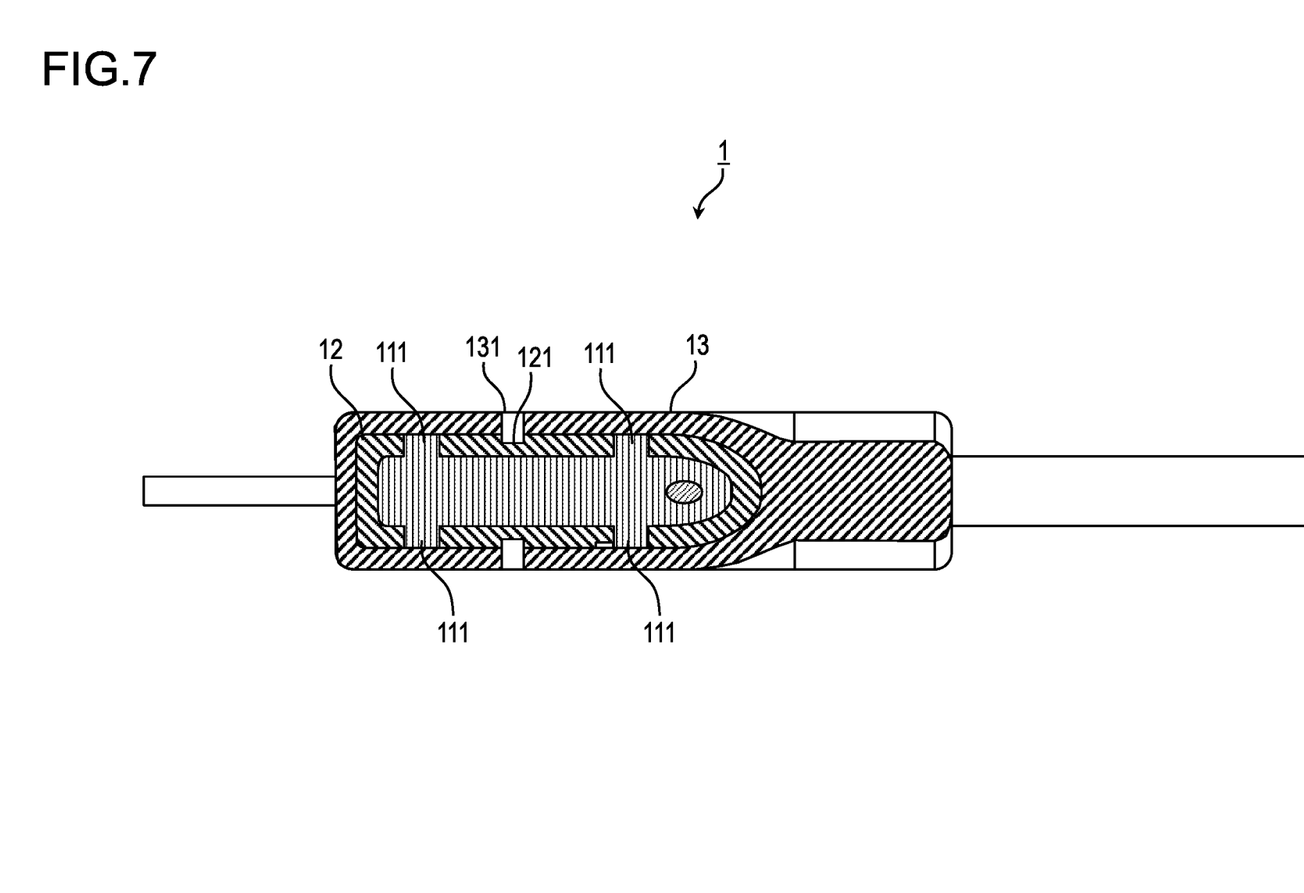
FIG. 7 is a sectional view taken along the 7-7 section line in FIG. 5.
Figure 8:
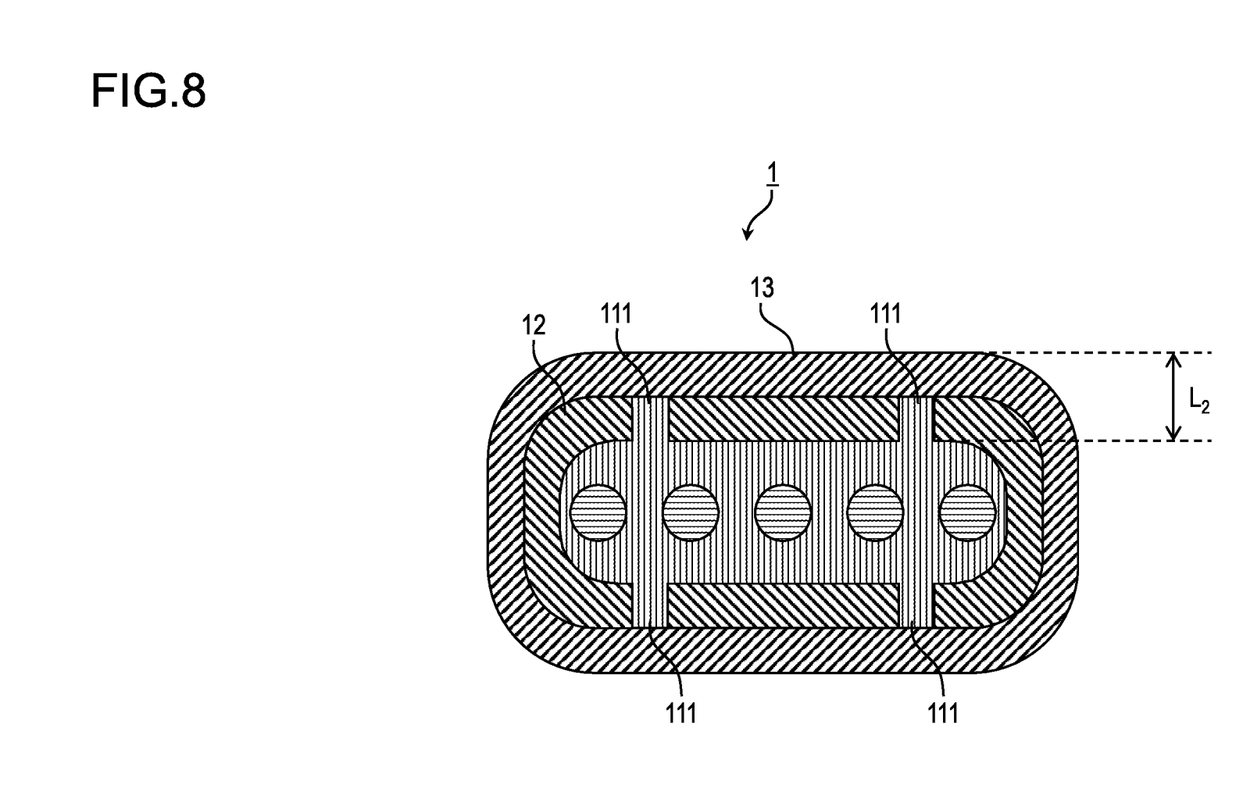
FIG. 8 is a sectional view taken along the 8-8 section line in FIG. 5.
Figure 9:
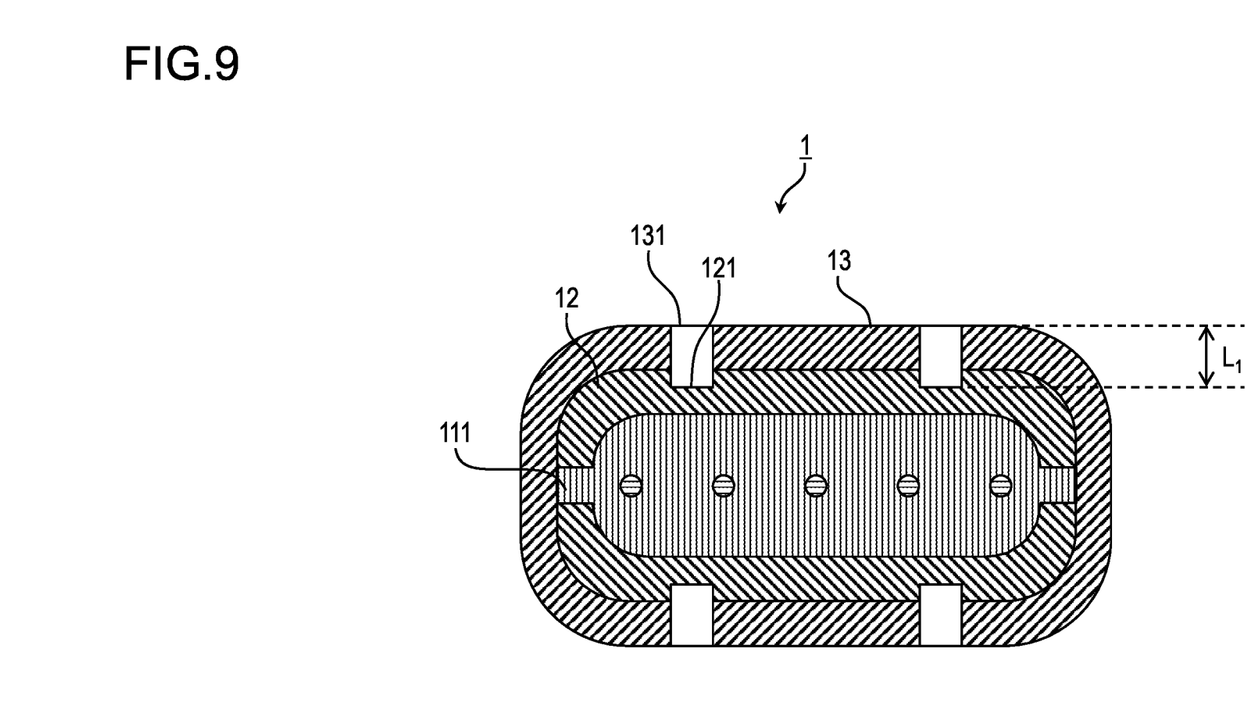
FIG. 9 is a sectional view taken along the 9-9 section line in FIG. 5.

The thickness of the third resin member 13, the depth of the concave portion 121, and the length of the mold pin may be determined so that a sum of the thickness of the third resin member 13 and the depth of the concave portion 121 is equal to the length of the mold pin, as illustrated in FIGS. 7 and 9.

It is enough to satisfy a condition that the length of the mold pin ($L_1$ in FIG. 9) is smaller than a sum of the thickness of the third resin member 13 and the height of the positioning convex portion 111 ($L_2$ in FIG. 8), because the concave portion 121 does not penetrate through the second resin member 12 when this condition is satisfied.

Figure 4:
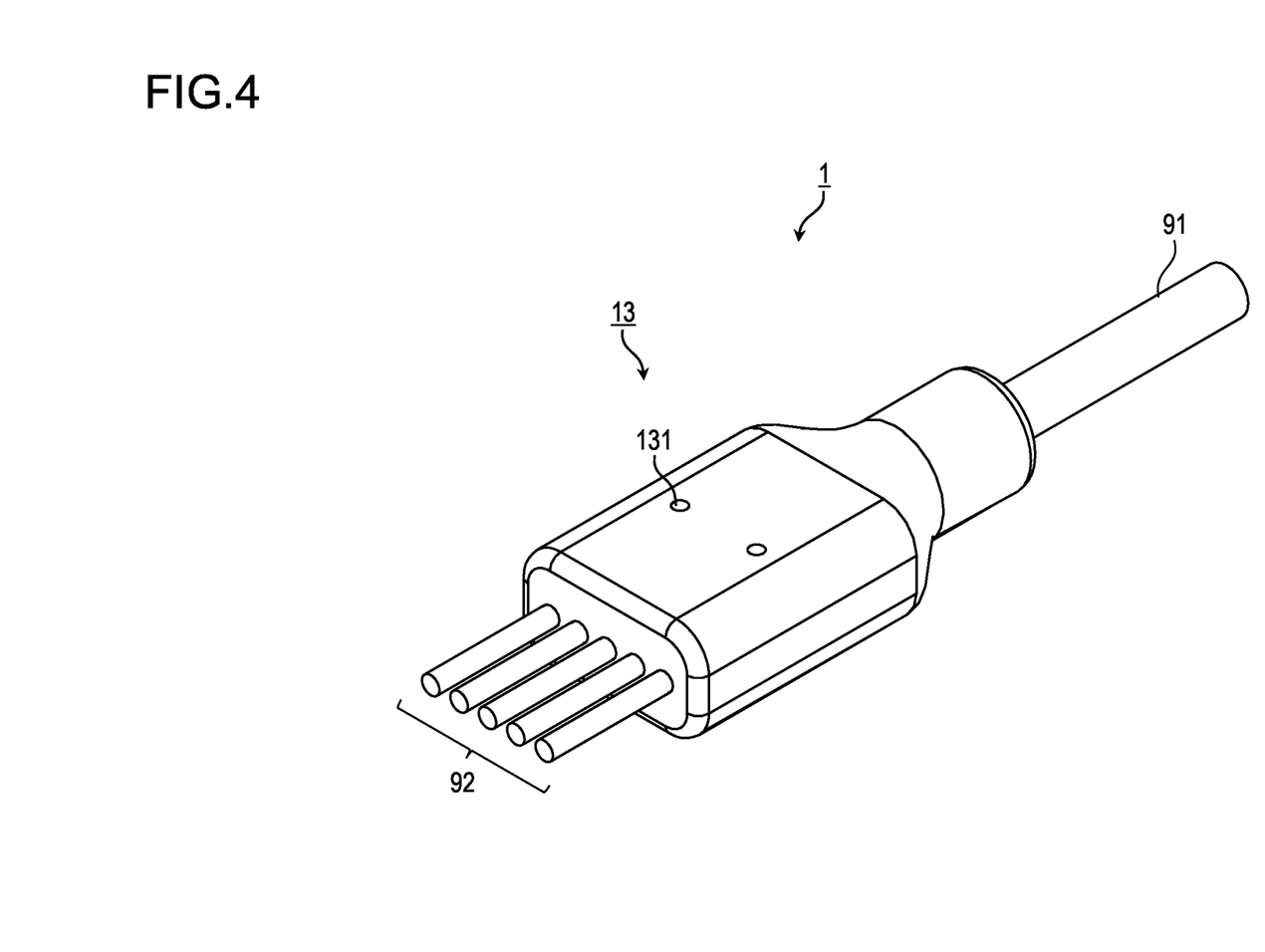
FIG. 4 is a perspective view illustrating a third resin member formed on the connecting part by insert-molding.
Figure 5:
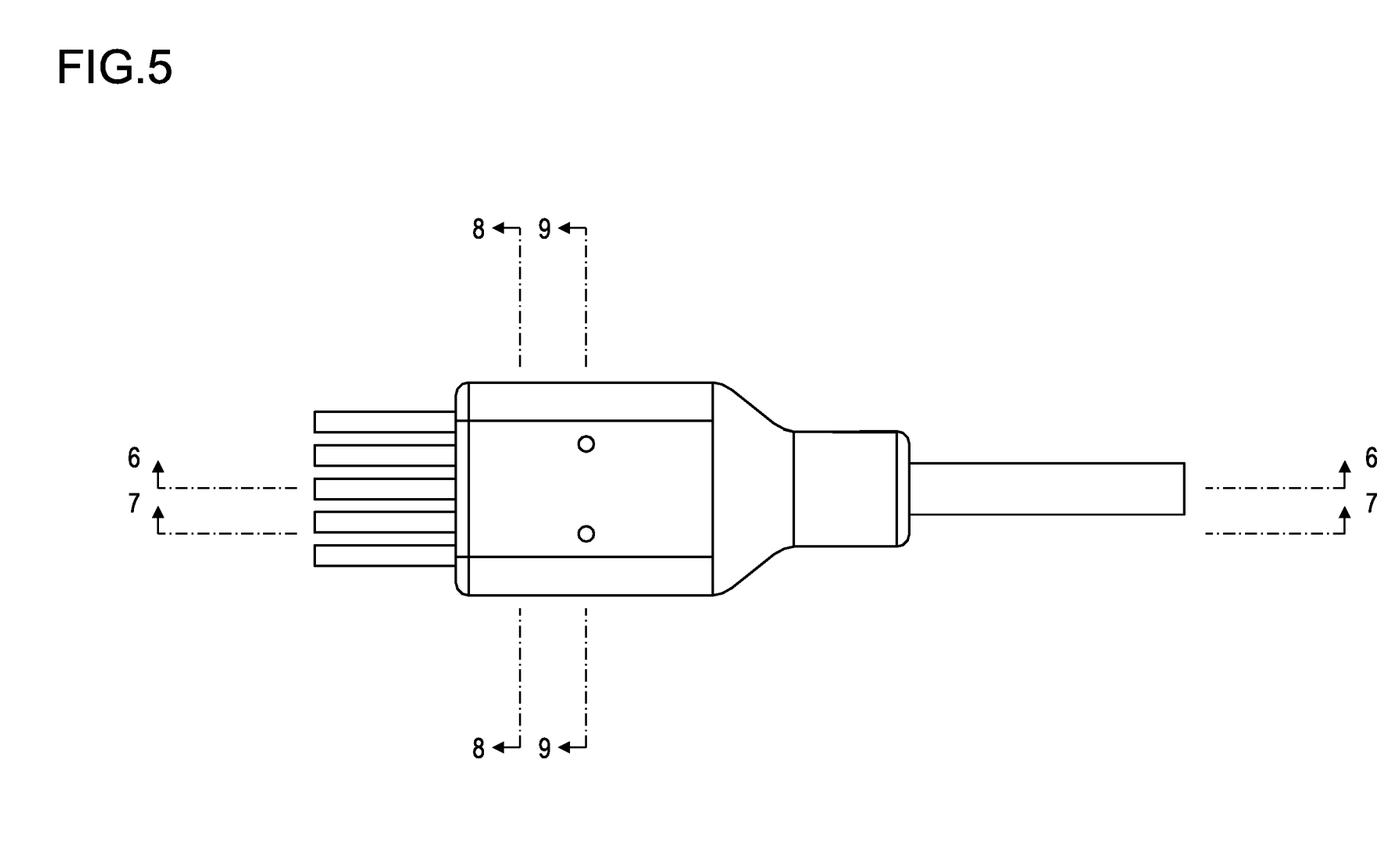
FIG. 5 is a plan view of a waterproof cable.
Figure 6:
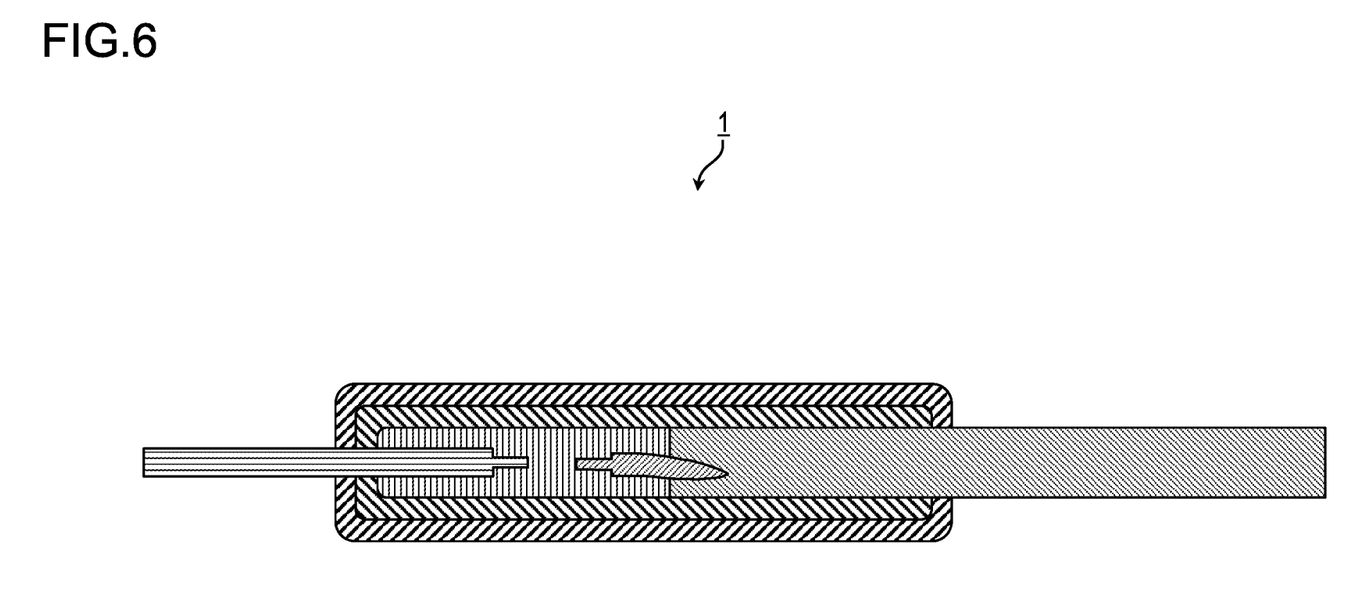
FIG. 6 is a sectional view taken along the 6-6 section line in FIG. 5.

As illustrated in FIG. 4, holes 131 are formed in the third resin member 13 by pulling out mold pins after forming the third resin member 13.

For example, each resin member may be formed so that the first resin member 11 and the second resin member 12 are made of the mutually-same material and the third resin member 13 is made of a softer material than that of the first resin member 11 and the second resin member 12.

<Method for Manufacturing Waterproof Cable 1>

Figure 10:
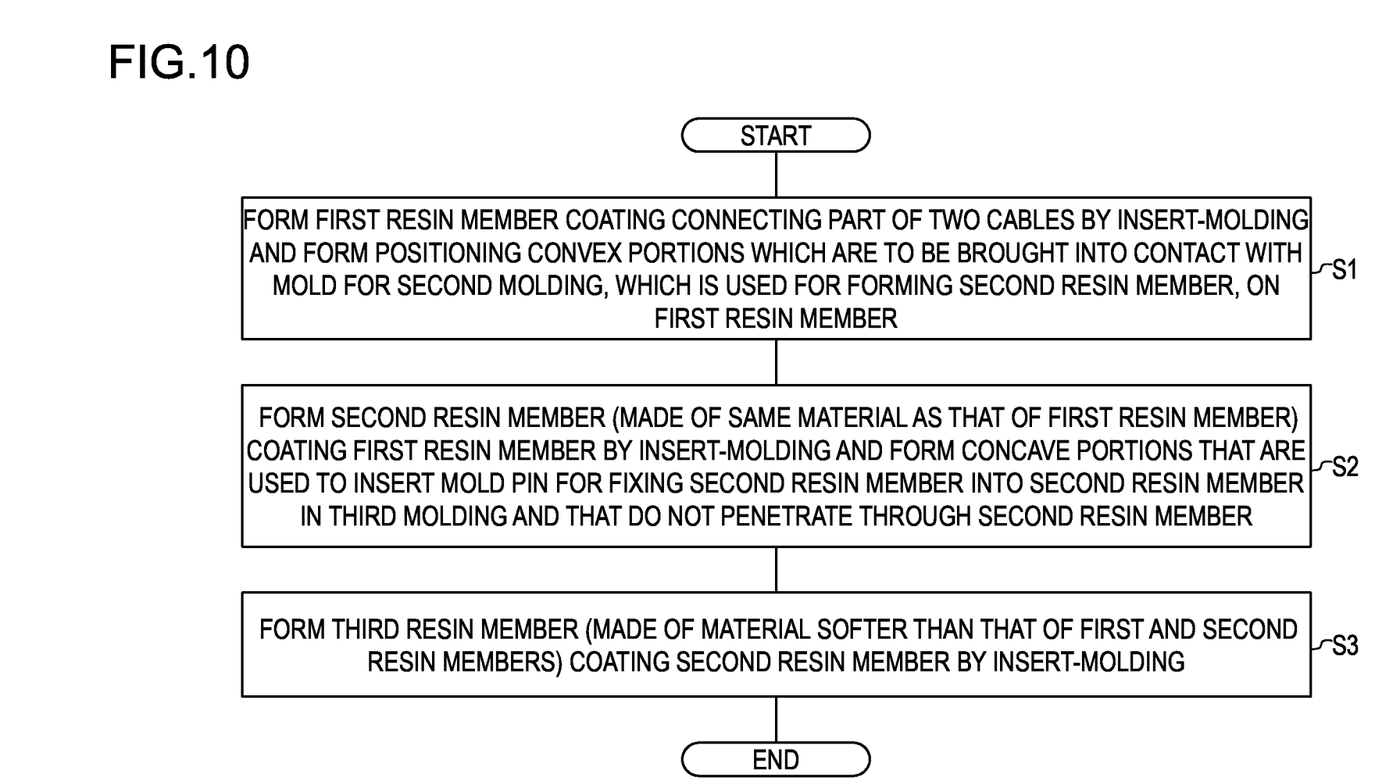
FIG. 10 is a flowchart illustrating a method for manufacturing a waterproof cable according to the first embodiment.

FIG. 10 illustrates a method for manufacturing the waterproof cable 1 according to the present embodiment. As illustrated in FIG. 10, the first resin member 11 coating the connecting part of two cables 91 and 92 is formed by insert-molding as a first molding step (S1). As described above, it is favorable to form the positioning convex portions 111 which are to be brought into contact with a mold for second molding, which is used for forming the second resin member 12, on the first resin member 11 in the first molding step. Subsequently, the second resin member 12 (favorably made of the same material as that of the first resin member 11) coating the first resin member 11 is formed by insert-molding as a second molding step (S2). As described above, it is favorable to form the concave portions 121 that are used to insert a mold pin for fixing the second resin member 12 into the second resin member 12 in a third molding step and that do not penetrate through the second resin member 12, in the second molding step. Then, the third resin member 13 (favorably made of a material softer than that of the first and second resin members 11 and 12) coating the second resin member 12 is formed by insert-molding as the third molding step (S3).

<Advantageous Effect>

It is generally hard to reduce eccentricity of a core wire to zero. Controlling an exposed part is also hard. Therefore, in the present embodiment, the first molding step for suppressing eccentricity of a core wire is performed to form the first resin member 11. Accordingly, even if a core wire is exposed from the first resin member 11 in the first molding step, waterproofness is secured by the second resin member 12 formed in the following second molding step. By providing the positioning convex portions 111 which are to be brought into contact with a mold for second molding in the first molding step, the first resin member 11 itself can be prevented from becoming eccentric. Further, the second resin member 12 is fixed by a mold pin so as not to be moved by molding pressure in the third molding step; water infiltration from the hole 131 for the mold pin can be prevented by setting an insertion position of the mold pin to be different from the positions of the positioning convex portions 111 described above. Furthermore, the same resin material is used in the first molding step and the second molding step, enhancing adhesiveness on joining surfaces and being able to prevent water infiltration from the joining surfaces of the first resin member 11 and the second resin member 12.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A waterproof cable comprising:
a first cable;
a second cable, an end of which is connected with an end of the first cable;
a first resin member that coats a connecting part and is formed by insert-molding;
a second resin member that coats the first resin member and is formed by insert-molding; and
a third resin member that coats the second resin member and is formed by insert-molding, wherein
a positioning convex portion, the positioning convex portion being brought into contact with a mold for second molding, the mold for second molding being used for forming the second resin member, is formed on the first resin member.

2. A waterproof cable comprising:
a first cable;
a second cable, an end of which is connected with an end of the first cable;
a first resin member that coats a connecting part and is formed by insert-molding;
a second resin member that coats the first resin member and is formed by insert-molding; and
a third resin member that coats the second resin member and is formed by insert-molding, wherein
a concave portion that is used for inserting a mold pin for fixing the second resin member in third molding and does not penetrate through the second resin member is formed.

3. The waterproof cable according to claim 1, wherein
a length of the mold pin for fixing the second resin member in the third molding is smaller than a sum of a thickness of the third resin member and a height of the positioning convex portion.

4. A waterproof cable comprising:
a first cable;
a second cable, an end of which is connected with an end of the first cable;
a first resin member that coats a connecting part and is formed by insert-molding;
a second resin member that coats the first resin member and is formed by insert-molding; and
a third resin member that coats the second resin member and is formed by insert-molding, wherein
the first resin member and the second resin member are made of a mutually-same material and the third resin member is made of a softer material than the material of the first resin member and the second resin member.

5. A waterproof cable manufacturing method comprising:
a first molding step in which a first resin member coating a connecting part of two cables is formed by insert-molding;
a second molding step in which a second resin member coating the first resin member is formed by insert-molding; and
a third molding step in which a third resin member coating the second resin member is formed by insert-molding, wherein
in the first molding step,
a positioning convex portion, the positioning convex portion being brought into contact with a mold for second molding, the mold for second molding being used for forming the second resin member, is formed on the first resin member.

6. The waterproof cable manufacturing method according to claim 5, wherein in the second molding step,
a concave portion that is used for inserting a mold pin for fixing the second resin member into the second resin member in the third molding step and does not penetrate through the second resin member is formed.

7. The waterproof cable manufacturing method according to claim 5, wherein
in the third molding step,
a length of the mold pin for fixing the second resin member is smaller than a sum of a thickness of the third resin member and a height of the positioning convex portion.

8. The waterproof cable manufacturing method according to claim 5, wherein
in the first molding step and the second molding step,
the first resin member and the second resin member are made of a mutually-same material, and
in the third molding step,
the third resin member is made of a softer material than the material of the first resin member and the second resin member.

* * * * *